June 24, 1969  E. G. ZOERB  3,451,413
FUNCTION GENERATORS

Filed Jan. 12, 1967  Sheet 1 of 4

INVENTOR.
EDWARD G. ZOERB
BY Charles J. Ungemach

ATTORNEY

June 24, 1969  E. G. ZOERB  3,451,413
FUNCTION GENERATORS

Filed Jan. 12, 1967  Sheet 3 of 4

INVENTOR.
EDWARD G. ZOERB
BY Charles J. Ungemach
ATTORNEY

United States Patent Office 3,451,413
Patented June 24, 1969

3,451,413
FUNCTION GENERATORS
Edward G. Zoerb, Roseville, Minn., assignor to Honeywell Inc., Minneapolis, Minn., a corporation of Delaware
Continuation-in-part of application Ser. No. 361,055, Apr. 20, 1964. This application Jan. 12, 1967, Ser. No. 621,376
Int. Cl. F15c 1/08, 1/12, 1/14
U.S. Cl. 137—81.5         6 Claims

ABSTRACT OF THE DISCLOSURE

A fluid amplifier for deflecting a high momentum fluid stream across a specially shaped splitter, so as to produce an output signal which is a function of the input signal and the shape of the splitter.

---

The invention herein described was made in the course of or under a contract or subcontract thereunder, with the Department of the Air Force.

Cross reference to related application

This application is a continuation-in-part of my application filed Apr. 20, 1964, Ser. No. 361, 055 and assigned to the same assignee as the present invention.

Background of the invention

This invention pertains to pure fluid devices and more particularly to pure fluid function generators. Pure fluid devices are defined as fluid devices wherein there are absolutely no moving parts other than the working media (fluid).

The applicant has provided a unique pure fluid function generator which is capable of generating the particular function desired. More specifically the applicant's pure fluid function generator may be utilized as a single degree of freedom device capable of generating a function: $y=f(x)$. The pure fluid function generator can also be utilized as a two degree of freedom device capable of generating a function: $y=f(x,z)$.

Summary of the invention

Structurally, the pure fluid function generator includes a high momentum stream of fluid flowing from a supply nozzle substantially along an axis. The high momentum is provided by an upstream pressure of sufficient magnitude. Those skilled in the art sometimes refer to a high pressure fluid stream, but a high momentum is to be inferred. A splitter element is positioned for impingement by the fluid stream. One or more control passages issue a low momentum fluid flow which intersects with the high momentum fluid stream and deflects the high momentum stream from the axis and varies the point at which it impinges on the splitter element. The particular function generated depends upon the position and characterization of the splitter element. The splitter element has a length which is substantially greater than the width of the high momentum fluid stream issuing from the supply nozzle. Stated otherwise, the high momentum fluid stream impinges upon only a portion of the total length of the splitter element. Thus by varying the particular portion of the splitter element upon which the high momentum stream impinges, the amount of fluid flowing on either side of the splitter element is varied. The difference in flow on either side of the splitter element is a function of the control signals applied to the function generator. Thus the splitter element must have a length greater than the width of the supply nozzle. The splitter element may have various shapes and positions, and the flow differential on either side of the splitter element is a function of which particular portion of the splitter element is utilized. The choice of which portion of the splitter element is to be utilized is made by supplying control signals to the control passage or passages.

Brief description of the drawing

The applicant's invention will become apparent from a study of the accompanying specification and claims in conjunction with the drawings in which:

Description of the preferred embodiment

Figure 1:
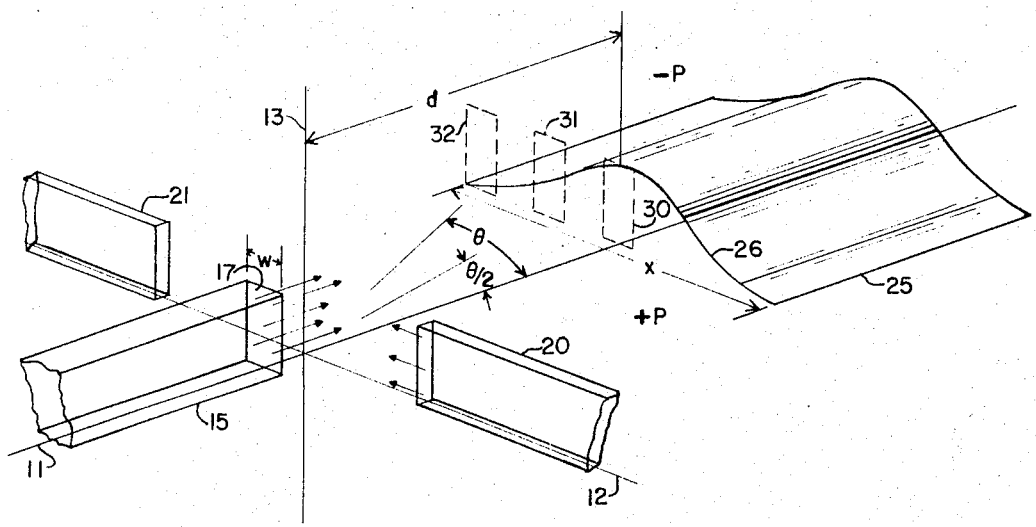
FIGURE 1 is a three dimensional representation of the applicant's function generator utilized as a single degree of freedom device.

FIGURE 1 is a three dimensional pictorial representation of the applicant's function generator utilized as a single degree of freedom device. In FIGURE 1, three orthogonal axes are illustrated and are identified by reference numerals 11, 12 and 13. A fluid supply passage 15 is provided which includes a supply nozzle 17 directed along axis 11. Fluid supply passage 15 is adapted to connect to a high momentum fluid source (not shown). The width of supply nozzle 17 is indicated by reference symbol w. Fluid flowing through supply nozzle 17 is directed substantially along axis 11.

Two fluid control passages 20 and 21 are provided. Control passages 20 and 21 are positioned along axis 12 and are in opposed relationship. Control passages 20 and 21 are adapted to be connected to a low momentum control signal source (not shown). Fluid flowing through control passages 20 and 21 is directed along axis 12.

A splitter element 25 is provided downstream from supply orifice 17 and is positioned for impingement by the high pressure fluid stream. Splitter element 25 is in the shape of a sine wave when viewed from the plane defined by axes 12 and 13. Splitter element 25 is positioned such that the center of the sine wave is located over axis 11. This sine wave shape of splitter element 25 is extended along and parallel to axis 11 for a finite distance as illustrated in FIGURE 1. All of the fluid flowing on the upward facing side of splitter element 25 as viewed in FIGURE 1 is directed into a first outlet passage (not shown). All of the fluid flowing on the downward side of splitter element 25 as viewed in FIGURE 1 is directed into a second outlet passage (not shown). The amount of fluid flow on either side of splitter element 25 can be determined by measuring the total pressure thereof. For purposes of discussion, the flow of fluid on the upward side of splitter element 25 will be designated as negative and the flow of fluid on the other side as positive. The leading edge of splitter element 25 is identified by reference numeral 26 and is positioned a distance $d$ downstream from the plane of control passages 20 and 21 (defined by axes 12 and 13).

Figure 2:
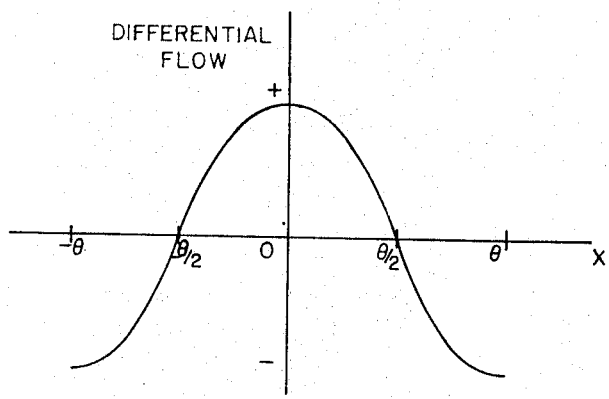
FIGURE 2 is a graph showing the output signal of the function generator illustrated in FIGURE 1.

In operation, a high momentum fluid flows through supply nozzle 17 so as to supply a well defined stream of fluid directed along axis 11. Any type of fluid may be utilized in the applicant's pure fluid function generator, either gases or liquid or a combination of both. The fluid stream issuing from nozzle 17 maintains its character, that is, it does not degenerate into a turbulent flow or diverge to any appreciable extent within the distance $d$. In the absence of any control signals in control passages 20 and 21, the fluid stream flowing from supply nozzle 17 flows substantially along axis 11. The fluid stream maintains its character from nozzle 17 to splitter element 25 so that the width of the fluid stream is substantially equal to $w$, the width of supply orifice 17. The cross sectional area of the stream when it reaches the splitter element 25 is illustrated by dotted line 30 in FIGURE 1. It is important to note that the width of the supply stream is only a fraction of the width $x$ of splitter element 25. In the absence of any control signals, all of the fluid flowing through supply orifice 17 flows on the downward side of splitter element 25 as represented by dotted line 30. This results in a maximum positive pressure. The maximum positive pressure at zero deflection of the supply fluid stream is indicated in FIGURE 2. FIGURE 2 is a graph plotting the flow differential output signal as the ordinate and the angle of deflection of the high pressure fluid stream as the abscissa.

When a control signal is received in one of the control passages, that is, when a pressure differential exists between control passages 20 and 21, the stream of fluid flowing through supply nozzle 17 is deflected through an angle which is indicative of the control signals. More specifically, if the fluid pressure in control passage 20 exceeds the fluid pressure in control passage 21, a greater amount of fluid will flow from control passage 20 than control passage 21. The pressure of the fluid in control passage 20 is substantially lower than the pressure of the fluid in supply passage 15. The low pressure fluid flowing through control passage 20 impinges upon the high pressure fluid flowing from supply nozzle 17 and results in a momentum interaction at the point of engagement. Vectorial analysis indicates that the resulting fluid flow will be in a direction having a slight angle with axis 11. Thus the low pressure fluid flowing through control passage 20 controls the high pressure fluid flowing from supply nozzle 17 and amplification is obtained from the momentum interaction. As the stream of fluid flowing from supply nozzle 17 is deflected away from axis 11, it impinges upon leading edge 26 of splitter element 25 and is divided so that a portion of the fluid flows above splitter element 25 and another portion below splitter element 25. When the control signal is one half of its maximum magnitude, the supply stream will be deflected through an angle $\theta/2$ and the stream of fluid will impinge upon leading edge 26 of splitter element 25 as indicated at number 31. At this point one half of the fluid flow is above splitter element 25 and the other half is below. Thus there is no flow differential across splitter element 25 and there is zero output signal. This is indicated on FIGURE 2 at $\theta/2$. With a full scale deflection from control passage 20, the stream of fluid issuing from supply nozzle 17 will be deflected through an angle $\theta$ and will intersect or impinge upon the leading edge of splitter element 25 as indicated by the cross sectional area representation 32. At this full scale deflection, all of the fluid flow from supply nozzle 17 is above splitter element 25 indicating a maximum negative pressure. This appears on FIGURE 2 at the angle of deflection $\theta$. As the control signal in control passages 20, 21 causes the stream of fluid to return to axis 11 the output signal goes from a maximum negative pressure to a maximum positive pressure. If a continuous increasing and decreasing differential signal is applied at control passages 20 and 21 the high momentum fluid stream is deflected from one side to the other causing a sine wave function to be generated.

It is possible that slight inconsistencies may appear in the output signal of the function generator due to unknown disturbances or phenomenon within the function generator. Any irregularities of this nature can be corrected in a single degree of freedom device by characterizing the splitter element. It is clear that by providing a different shape to the leading edge of the splitter element 25, different functions may be generated in this single degree of freedom device. For example, a V-shaped splitter element would provide a linear output with a linear input. Any number of nonlinear shapes may be provided to produce various output signals.

Figure 3:
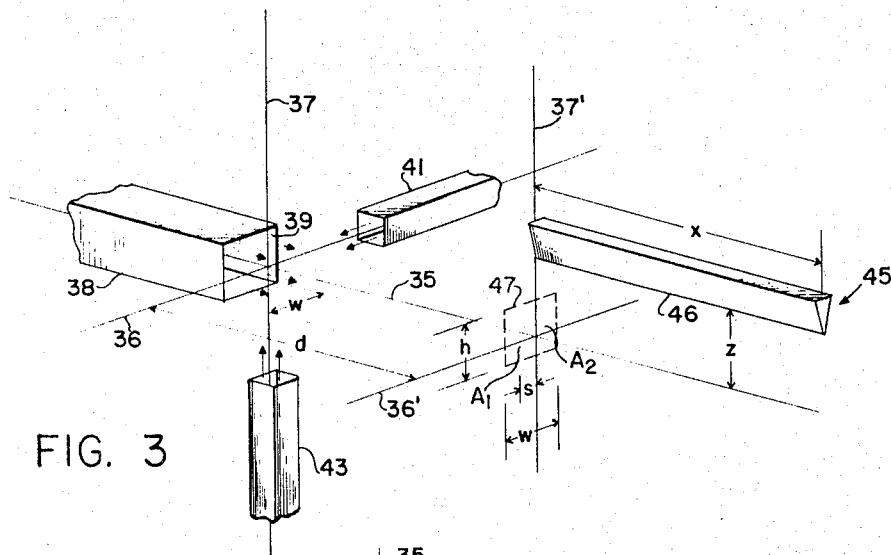
FIGURE 3 is a three dimensional representation of the applicant's function generator utilized as a two degree of freedom device.

Referring now to FIGURE 3, the two degree of freedom pure fluid function generator is pictorially represented. Three orthogonal axes are illustrated in FIGURE 3 and are identified by reference numerals 35, 36 and 37. A fluid supply passage 38 is provided including a supply orifice 39. The width of supply orifice 39 is indicated by reference symbol $w$. Fluid supply passage 38 is adapted to be connected to a high momentum fluid source (not shown). Fluid flowing through supply nozzle 39 is directed substantially along axis 35.

A fluid control passage 41 is provided. Control passage 41 is adapted to be connected to a low momentum control signal source (not shown). Fluid flow through control passage 41 is directed along axis 36. The applicant's pure fluid function generator is operable with only one control passage oriented along axis 36, however, in many applications a pair of opposed control passages positioned along axis 36 may be utilized.

Another fluid control passage 43 is provided. Control passage 43 is adapted to be connected to a low momentum fluid signal source (not shown). Fluid flow through control passage 43 is directed along axis 37. The applicant's pure fluid function generator is operable with only a single control passage oriented along axis 37, however, it is possible in many applications to utilize a pair of control passages positioned in opposed relationship along axis 37.

A splitter element 45 is provided. In this particular embodiment, splitter element 45 is an elongated element having a wedge-like cross section. The leading edge of splitter element 45 is identified by reference numeral 46. Splitter element 45 is positioned for impingement by the fluid flowing through supply nozzle 39. In this particular embodiment, splitter element 45 is positioned substantially parallel to axis 35 and lies in a plane defined by axes 35, 37. In order to describe the position of splitter element 45, an axis 37' which is parallel to axis 37, and an axis 36' which is parallel to axis 36 are represented in FIGURE 3. As illustrated in FIGURE 3 the splitter element 45 is positioned downstream a distance $d'$ from the plane of control passages 41 and 43 (defined by axes 36 and 37). The leading edge 46 of splitter element 45 is positioned a distance $z$ above axis 35. Splitter element 45 extends along axis 35 over a length $x$. It is important to note that the length $x$ of splitter element 45 is substantially greater than the width $w$ of supply nozzle 39. Thus when the fluid stream issuing from supply nozzle 39 impinges upon splitter element 45, it is in contact with only a portion of the length $x$ of splitter element 45.

A first outlet passage (not shown) is provided to receive all of the fluid flow upon one side of splitter element 45. Stated otherwise, all of the fluid lying on one side of the plane defined by axes 35 and 37 will flow into a first outlet passage. A second outlet passage is provided (not shown) to receive all of the fluid flow upon the other side of splitter element 45.

In operation, fluid supply passage 38 is connected to a high momentum fluid source (not shown). Any type of fluid may be utilized in the applicant's pure fluid function generator, either gaseous, liquid or a combination of both. In the absence of any control signals, the fluid flowing from supply nozzle 39 flows substantially along axis 35. The fluid exhausts through the first and second outlet passages at substantially equal flow and at substantially equal pressure levels. Thus there is no differential output signal (fluid flow or pressure) generated by pure fluid function generator in the absence of any control signals.

Assume that a control signal is received in control passage 41. This results in a low momentum fluid flow substantially along axis 36. Thus the low momentum fluid flowing through control passage 41 impinges upon the high pressure fluid flowing from supply nozzle 39 and results in a momentum interaction at the point of engagement. The resulting fluid flow is illustrated in FIGURE 4.

Figure 4:
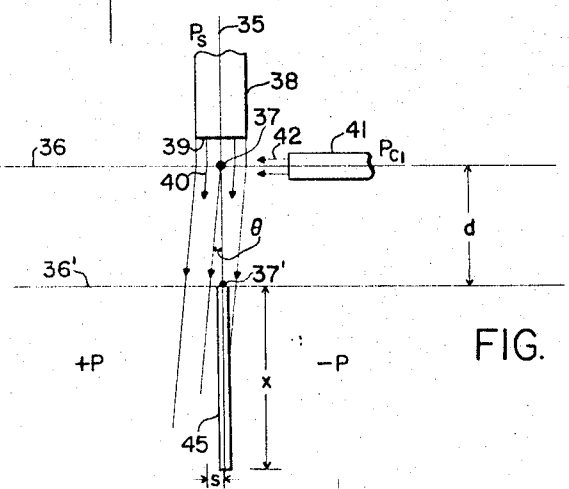
FIGURE 4 is a plan view of the function generator represented in FIGURE 3.

FIGURE 4 is a plan view of the pure fluid function generator of FIGURE 3 as viewed in the plane defined by axes 35 and 36. Like reference numerals are utilized in FIGURE 4 to identify identical elements appearing in FIGURE 3. The high momentum fluid flowing through supply passage 38 and supply orifice 39 is represented by the arrows 40 in FIGURE 4. It is clear that the direction of the fluid 40 is initially along axis 35. The flow of fluid through control passage 41 is illustrated by the arrows identified by reference numeral 42. Thus the low momentum fluid flowing through control passage 41 impinges upon the high momentum fluid 40 flowing through supply nozzle 39, and results in a momentum interaction at the point of engagement. The resulting fluid flow is in a direction having a slight angle with axis 35, that is, displaced away from control passage 41 through an angle $\theta$ from axis 35. The exact nature of the interaction of the high momentum fluid 40 flowing through supply nozzle 39 and the low momentum fluid 42 flowing through control passage 41 is an extremely complex relation. However, it can be shown that the resulting fluid flow is adequately described by reference to the upstream pressures of fluid 40 and fluid 42. The upstream pressure of fluid 40 flowing through supply nozzle 39 is represented by $P_s$. The upstream pressure of fluid 42 flowing through control passages 41 is represented by the symbol $P_{c1}$. Thus tangent $\theta = P_{c1}/P_s$.

It is clear from FIGURE 4 that when the fluid stream flowing from supply nozzle 39 reaches the plane defined by axes 36' and 37', a portion of the stream lies on one side of a plane defined by axis 37' and 35 and the remainder on the other side of this plane. For purposes of description, assume that that total flow of fluid to the left of the plane defined by axes 37' and 35 to be positive, such that the total pressure thereof can be represented by $+P$. The flow of fluid to the right of this plane is then represented by the total pressure referred to by $-P$.

A representation of the cross sectional area of the fluid stream as it reaches the plane defined by the axes 36' and 37' is illustrated in FIGURE 3 by the dotted line 47. The fluid stream does not lose its character, but essentially maintains the same cross sectional area as it had when it issued from supply nozzle 39. The width of the fluid stream is still equal to $w$; the height of the fluid stream is equal to $h$. The stream of fluid has a velocity equal to $v$. A greater portion of the fluid flow lies on the left hand side of the plane defined by axes 35 and 37' as viewed in FIGURE 3. The cross sectional area of this portion of the flow on the left side of the plane is identified by $A_1$. The area of that portion of the flow on the other side of the plane is identified as $A_2$. The flow differential $\Delta F$ across this plane is given by the following formula:

$$\Delta F = \rho v (A_1 - A_2)$$

The amount the stream of fluid is deflected from the axis 35 at the plane defined by axes 36', 37' is identified by symbol $s$. Thus tangent $\theta = s/d$, and the flow differential across the plane is given by the following formula:

$$\Delta F = \rho v \left(\frac{wh}{2} + sh\right) - v\left(\frac{wh}{2} - sh\right)$$

$$\Delta F = 2\rho vhs$$

since $$\tan \theta = \frac{s}{d} = \frac{P_{c1}}{P_s}, \Delta F = 2\rho vhd\frac{P_{c1}}{P_s}$$

Figure 5:
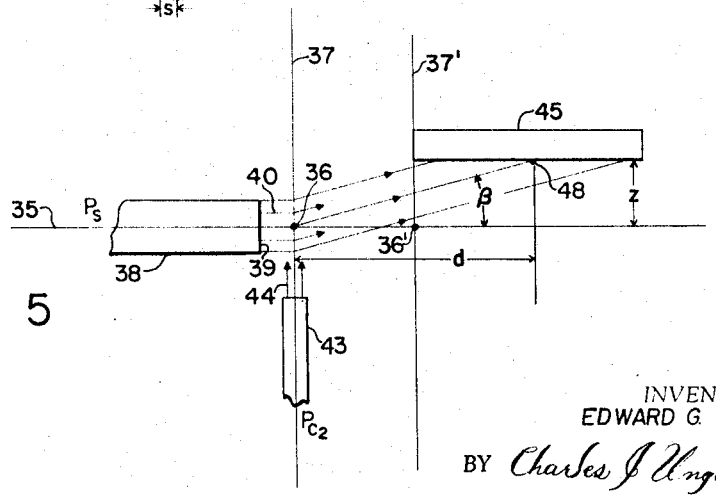
FIGURE 5 is a side view of the function generator represented in FIGURE 3.

The deflection of the fluid stream due to the flow of fluid through control passage 43 is illustrated in FIGURE 5. FIGURE 5 is a side view of the pure fluid function generator of FIGURE 3 as viewed in the plane defined by axes 35 and 37. Similar reference numerals are utilized in FIGURE 5 for the identical elements illustrated in FIGURE 3. The high pressure flow of fluid through supply nozzle 39 is illustrated by the vectors 40. In the absence of any control signals, the fluid stream issuing from supply nozzle 39 flows substantially along axis 35 in the plane defined by axes 35 and 37.

When a control signal is received in control passage 43, low momentum fluid 44 flows through control passage 43 substantially along axis 37. The low momentum fluid flowing through control passage 43 impinges upon the high momentum fluid flowing from supply nozzle 39 and results in a momentum interaction at the point of engagement. The resulting fluid flow will be in a direction having a slight angle $\beta$ with axis 35, that is, displaced towards splitter element 45. Thus it is clear from FIGURE 5 that by varying the magnitude of control signal flowing through control passage 43 the point of impingement with splitter element 45 can be varied. The point of impingement is identified as the center point of the fluid stream issuing from supply nozzle 39, and is identified by reference numeral 48.

The deflection of the high momentum fluid 40 by the low momentum fluid is generally defined with reference to the upstream pressures existing in the supply passage 38 and the control passage 43. The upstream supply pressure in supply passage 38 is identified by reference symbol $p_s$; the upstream control pressure in control passage 43 is identified by the symbol $p_{c2}$. With reference to FIGURE 5, tan $\beta = p_{c2}/p_s$. In addition, tan $\beta = z/d$ where $z$ equals the distance of splitter element 45 above axis 35 (a constant in this specific embodiment) and $d$ equals the distance from the plane 37, 36 to the impingement point 48. As stated previously, the split distance downstream $d$ will vary with the magnitude of the control signal in control passage 43. It is important to note, that the split distance downstream $d$ in FIGURE 5 is identical to the split distance represented by symbol $d$ in FIGURE 5. From tan $\beta = z/d = p_{c2}/p_s$ $$d = z \frac{P_s}{P_{c2}}$$

The formula for the flow differential across the splitter element in FIGURE 4 was:

$$\Delta F = 2\rho vhdx \frac{P_{c1}}{P_s}$$

By substitution, this formula becomes:

$$\Delta F = 2\rho vh \left(\frac{zP_s}{P_{c2}}\right)\left(\frac{P_{c1}}{P_s}\right)$$

$$\Delta F = 2\rho vhz \frac{P_{c1}}{P_{c2}}$$

If the control flows are small with respect to the supply flow, the control flow should not appreciably affect $\rho$ (the density of the fluid) and $v$. Therefore $$\Delta F = K \frac{P_{c1}}{P_{c2}}$$

Therefore the flow differential output of the applicant's pure fluid function generator is a ratio of the two total pressures supplied to the control passages. As in the single degree of freedom device the splitter element may be characterized to correct for slight inconsistencies in the output signal (if any appear). This particular configuration of a splitter element is only one embodiment which may be utilized in the applicant's pure fluid function generator in the two degree of freedom mode. It is clear that by various positioning and characterization of the splitter element, various output functions can be obtained with the applicant's invention. For example, the leading edge of the splitter element may have any desired shape (it does not have to be a straight line, but may be shaped as a linear or nonlinear function). Further, the leading edge can be positioned for impingement by the fluid at various angles to the supply stream (it does not have to be a constant distance from or parallel to axis 35 as illustrated in FIGURE 3).

Figure 6:
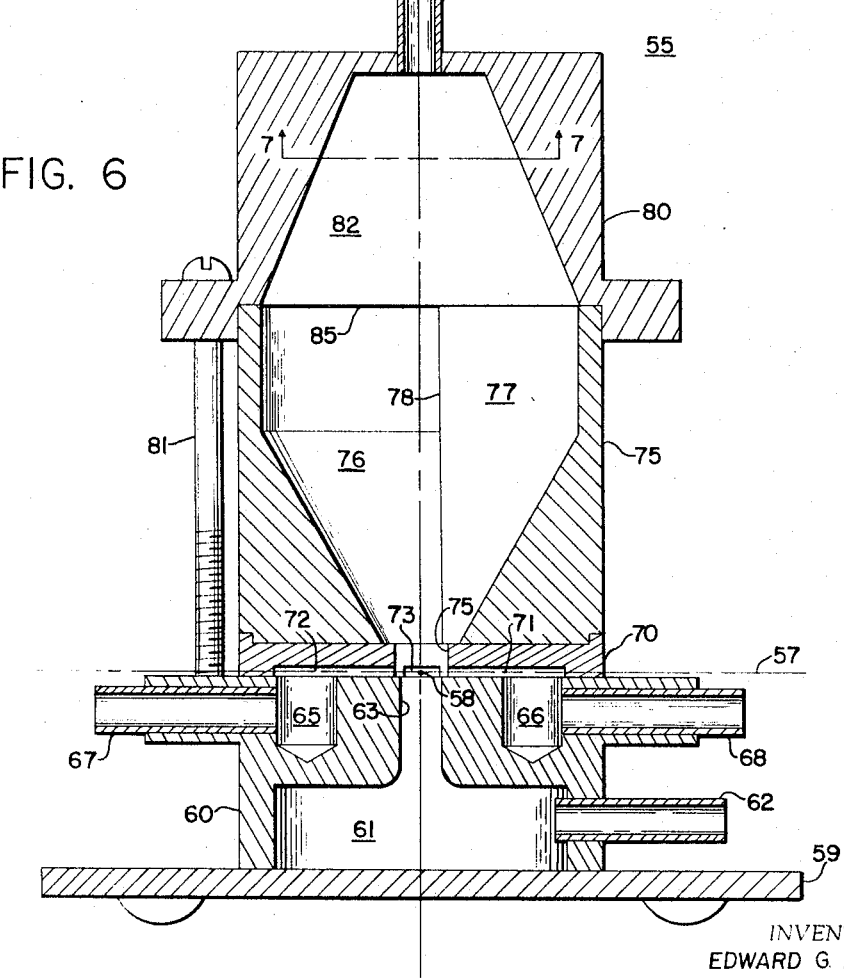
FIGURE 6 is a cross sectional view of the applicant's function generator utilized as a pressure ratio device.

FIGURE 6 illustrates a cross sectional view of a pure fluid pressure ratio sensor, that is, a two-degree of freedom pure fluid function generator. The pressure ratio sensor is identified by reference numeral 55. Three orthogonal axes are illustrated in FIGURE 6 and are identified by reference numerals 56, 57 and 58. Axes 56 and 57 lie in the plane of the drawing of FIGURE 6 and axis 58 is perpendicular thereto.

A circular base plate 59 is provided. A cylindrical nozzle assembly 60 is rigidly attached to base plate 59 and is symmetrical about axis 56. Nozzle assembly 60 includes a supply chamber 61 which is adapted to be connected to high pressure fluid source through a connector means 62. Nozzle assembly 60 also includes a supply nozzle 63 which is symmetrical about axis 56. Four control chambers are provided within nozzle assembly 60; two control chambers 65 and 66 are illustrated in FIGURE 6. Control chambers 65 and 66 are adapted to be connected to a suitable low pressure control signal source by means of connectors 67 and 68 respectively.

A cylindrical control passage assembly 70 is positioned adjacent nozzle assembly 60. Assembly 70 includes a central opening 75 therein which is symmetrical with respect to axis 56. Control passage assembly 70 contains four control passages therein; two control passages are aligned along axis 57 and two control passages are aligned along axis 58. The two control passages aligned along axis 57 are identified in FIGURE 6 by reference numerals 71 and 72. Control passages 71 and 72 are in communication with chambers 65 and 66 respectively. One of the control passages aligned along axis 58 is visible in FIGURE 6 and is identified by reference numeral 73.

A cylindrical splitter housing 75 is positioned adjacent to control passage assembly 70 and symmetrical with respect to axis 56. A generally conical chamber 76 is provided within housing 75 and is symmetrical with respect to axis 56. A thin planar splitter element 77 is positioned within chamber 76 and lies substantially in the plane defined by axes 56 and 57. Splitter element 77 has a thickness of approximately .020 inch. Splitter element 77 has a leading edge identified by reference numeral 78. It should be noted that splitter element 77 is positioned downstream from supply nozzle 63 and is also spaced apart from axis 56. The distance splitter element 77 is positioned downstream from supply nozzle 63 is the distance $d$ referred to in FIGURE 3. The amount that leading edge 78 is spaced apart from axis 56 is the distance $z$ referred to in FIGURE 3.

Figure 7:
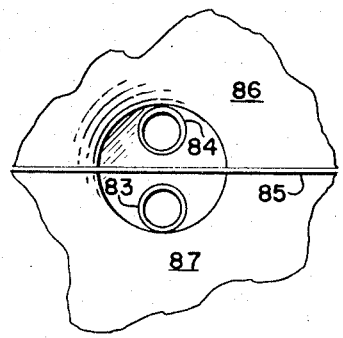
FIGURE 7 is a cross sectional view taken along line 7—7 in FIGURE 6.

An outlet passage assembly 80 is positioned adjacent to splitter housing 75. A plurality of screws, such as 81, are provided to rigidly attach outlet passage assembly 80 to nozzle assembly 60. The screws also function to maintain control passage assembly 70 and splitter housing 75 symmetrical about axis 56 and fixed with respect to nozzle assembly 60, and outlet passage assembly 80. A generally conical chamber 82 is provided within outlet passage assembly 80 and is symmetrical with respect to axis 56. A pair of outlet conduits 83 and 84 are provided in outlet passage assembly 80. Outlet conduits 83 and 84 are better illustrated with reference to FIGURE 7. Outlet conduits 83 and 84 are in communication with chamber 82 in outlet passage assembly 80. A planar baffle 85 is positioned within chamber 82 lying in the plane defined by the axes 56 and 57. Baffle 85 functions to divide chamber 82 into two equal chambers 86 and 87. Chamber 86 in conjunction with outlet conduit 84 comprises a first outlet passage which receives all of the fluid which flows on one side of splitter element 77. Chamber 87 in conjunction with outlet conduit 83 comprises a second outlet passage which receives all of the fluid which flows on the other side of splitter element 77. The output of pressure ratio device 55 is the flow differential between the first outlet passage and the second outlet passage.

In operation, connector 62 is connected to a high pressure fluid source so that a stream of fluid flows from supply nozzle 63 substantially along axis 56. Control passages 71 and 72 are connected to a first low pressure signal source. Control passage 73 and its opposing passage (not shown) are connected to a second low pressure fluid signal. The stream of fluid flowing from supply nozzle 63 is deflected by the flow of fluid through the control passages and impinges upon and is divided by splitter element 77 in the same manner as explained with reference to FIGURES 3, 4 and 5. Thus, detailed operation of device 55 need not be repeated here. The fluid flow on one side of splitter element 77 is collected by the first outlet passage and the flow of fluid on the opposite side of splitter element 77 is connected by the second outlet passage. The flow differential, which may be sensed by the total pressure thereof, is the output signal of pressure ratio device 55.

It is possible that there may be end flow around the splitter element at the point of impingement of the fluid stream with the splitter element in certain designs. This is remedied by providing flow guides (baffles) to inhibit the end flow.

Figure 8:
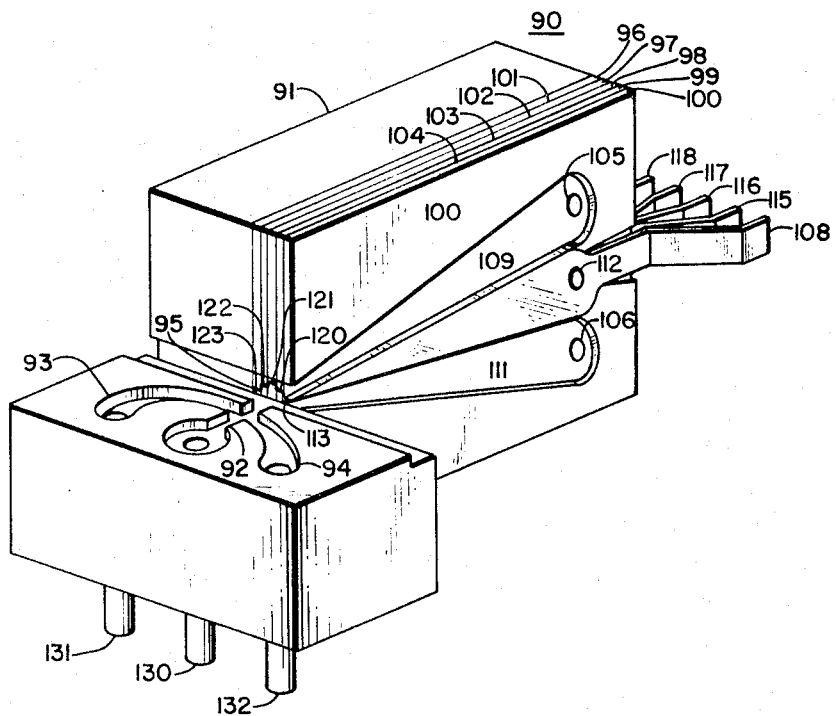
FIGURE 8 is an alternate embodiment of applicant's function generator shown partially in section.

Referring now to FIGURE 8, reference numeral 90 indicates an alternate embodiment of applicant's sine wave generator partially in section. The sine wave generator 90 is comprised of a housing 91, a power nozzle 92 for supplying a high momentum fluid stream, a first control passage 93 for supplying a first control stream of fluid and a second control passage 94 for supplying a second control stream of fluid. Located downstream from the power nozzle 92 is a leading edge 95 which is approximately sine wave shaped (indicated by a heavy line), which is comprised of a series of splitter tips and baffles. Located downstream on the top side of the leading edge 95 is an outlet passage 105 and similarly located downstream on the bottom side of leading edge 95 is an output passage 106.

Because of the difficulty in fabricating a contoured surface it is often easier to build a splitter which approximates a sine function rather than one that has a smooth sine function, such as shown in FIGURE 1. One of the ways of building a splitter which approximates a sine wave is to use a series of small splitter tips and baffles which when placed together define a leading edge that approximates the shape of a sine wave. In order to build such a leading edge applicant has used a number of splitter tips 113, 120, 121, 122, and 123; a series of thin plates 96, 97, 98, 99, and 100; and a series of thinner baffles 101, 102, 103, and 104 which are alternately stacked in housing 91. The baffles 101, 102, 103, and 104 go completely through the housing 91 and inhibit end flow of the high momentum fluid as it enters the receiver ports located downstream of the leading edge 95. A number of receiver chambers are connected to the outlet passages 105, and 106, two of which are visible (109 and 111). Receiver chambers 109 and 111 are formed in the plate 100, and are separated by a splitter 108. The other receiver chambers, which are hidden, are similarly formed by the plates 96, 97, 98, 99 and baffles 101, 102, 103, and 104. The receiver chambers 109 and 111 have the splitter 108 mounted in a rotatable manner therebetween at point 112 so that the splitter tip 113, which forms a part of the leading edge 95, may be raised or lowered by moving the rear portion of splitter 108 upward or downward. Similarly, the position of splitter tips 120, 121, 122, and 123 can be changed by raising or lowering the rear portions of splitters 115, 116, 117 and 118. The splitter tips 120, 121, 122, and 123 which comprise a portion of leading edge 95 can thus be varied with respect to one another. Hence, it is possible, to approximate a sine function by positioning the splitter tips 113, 120, 121, 122, and 123 by manipulation of the rear portion of the splitters 108, 115, 116, 117, and 118. It will be apparent that the number of splitters can be varied and the number of splitters used will depend on how accurately one wishes to approximate a particular function. By having an adjustable splitter, it is also possible to produce leading edges with shapes, other than the sine wave shown in FIGURE 8.

The operation of the device shown in FIGURE 8 is the same as the one shown in FIGURES 1 and 2 in that a high momentum fluid stream is supplied from power nozzle 92 and is deflected by control signals from passages 93 and 94. The high momentum fluid is supplied to the power nozzle 93 is supplied by a passage 131 and the control fluid to passage 194 is supplied through a conduit 132.

Thus the applicant has provided a pure fluid function generator which may be utilized in either a one degree of freedom or a two degree of freedom mode. A typical illustration of a single degree of freedom pure fluid function generator is a device wherein a sine wave is generated as illustrated in FIGURES 1, 2 and 8. A typical example of a two degree of freedom fluid function generator is a device wherein a pressure ratio output signal is provided such as illustrated with reference to FIGURES 3 through 7.

Although the applicant's invention has been described and illustrated in detail, it is to be clearly understood that the same is by way of illustration and example only and is not to be taken by way of limitation, the spirit and scope of this invention being limited only by the terms of the appended claims.

I claim:
1. A fluid function generator comprising:
   a port for directing a fluid in a stream along an axis;
   splitter means located downstream from said port and extending transversely with respect to said axis to divide the stream into first and second portions, said splitter having leading edge means upon which the fluid stream impinges, said leading edge means being characterized by having a width greater than the width of said port and a shape which is a predetermined non-linear mathematical function; and
   control means for deflecting the stream transversely along said splitter so that an output signal is produced which has a non-linear relationship, determined by the shape of said leading edge and an input signal supplied to said control means.
2. The apparatus of claim 1 wherein said leading edge means has a shape at least approximating a trigonometric function.
3. The apparatus of claim 1 wherein said leading edge has a shape at least approximating a sine function.
4. The apparatus of claim 1 wherein said control means are located substantially perpendicular to the stream.
5. A fluid function generator comprising:
   a fluid supply nozzle operable to supply a stream of fluid along an axis;
   a first pair of control passages operable to supply a flow of fluid therethrough so as to deflect said stream transversely from said axis; and
   transversely extending means located downstream from said nozzle for dividing the fluid stream into at least two portions, said means having leading edge means which is characterized by having a non-linear shape so that when a control fluid signal is supplied to said control passages an output signal is produced which is a mathematical function of the non-linear shape.
6. The apparatus of claim 5 wherein said leading edge means has the shape at least approximating a sine wave.

References Cited

UNITED STATES PATENTS

| | | | |
|---|---|---|---|
| 3,171,422 | 3/1965 | Evans | 137—81.5 |
| 3,181,546 | 5/1965 | Boothe | 137—81.5 |
| 3,185,166 | 5/1965 | Horton et al. | 137—81.5 |
| 3,186,422 | 6/1965 | Boothe | 137—81.5 |
| 3,228,410 | 4/1966 | Warren et al. | 137—81.5 |
| 3,246,863 | 4/1966 | Posingies | 137—81.5 XR |
| 3,250,469 | 5/1966 | Colston | 137—81.5 XR |
| 3,294,103 | 12/1966 | Bowles | 137—81.5 |

SAMUEL SCOTT, *Primary Examiner.*